(12) United States Patent
Sauer et al.

(10) Patent No.: US 8,382,871 B2
(45) Date of Patent: Feb. 26, 2013

(54) VACUUM CLEANER FILTER BAG AND USE OF SAID BAG

(75) Inventors: Ralf Sauer, Overpelt (BE); Jan Schultink, Overpelt (BE)

(73) Assignee: Eurofilters Holding N.V., Overpelt (BE)

( * ) Notice: Subject to any disclaimer, the term of this patent is extended or adjusted under 35 U.S.C. 154(b) by 617 days.

(21) Appl. No.: 12/093,932

(22) PCT Filed: Nov. 22, 2006

(86) PCT No.: PCT/EP2006/011191
§ 371 (c)(1),
(2), (4) Date: Jul. 22, 2008

(87) PCT Pub. No.: WO2007/059939
PCT Pub. Date: May 31, 2007

(65) Prior Publication Data
US 2008/0314005 A1    Dec. 25, 2008

(30) Foreign Application Priority Data

Nov. 22, 2005  (EP) .................................... 05025480
Nov. 28, 2005  (EP) .................................... 05025904
Dec. 9, 2005   (EP) .................................... 05027013
Dec. 13, 2005  (EP) .................................... 05027219
Feb. 23, 2006  (EP) .................................... 06003723
Mar. 10, 2006  (EP) .................................... 06004980
Apr. 5, 2006   (DE) ......................... 10 2006 016 009

(51) Int. Cl.
*A47L 9/14*   (2006.01)
*B01D 46/02*  (2006.01)

(52) U.S. Cl. ............ 55/334; 55/362; 55/368; 55/DIG. 2
(58) Field of Classification Search .................. 55/367, 55/368, 376, 381, 374, DIG. 2, DIG. 3, 309, 55/385.1, 490, 502, 507, DIG. 24, DIG. 35; 96/222; 493/220; 15/347, 352, 353
See application file for complete search history.

(56) References Cited

U.S. PATENT DOCUMENTS 2,068,332 A   1/1937   Kneisley
(Continued)

FOREIGN PATENT DOCUMENTS

BE   529 649    7/1954
DE   1703030    1/1972
(Continued)

OTHER PUBLICATIONS

International Search Report completed Feb. 26, 2007 for International Application No. PCT/EP2006/011191.

*Primary Examiner* — Duane Smith
*Assistant Examiner* — Minh-Chau Pham
(74) *Attorney, Agent, or Firm* — Brinks Hofer Gilson & Lione

(57) ABSTRACT

A vacuum cleaner filter bag with an inlet opening including a deflection device and an air-permeable material is provided. The deflection device is arranged in the interior of the vacuum cleaner filter bag in the area of the inlet opening and which is implemented such that an air current flowing in through the inlet opening can be deflected by the deflection device. The air-permeable material layer is arranged in the interior of the vacuum cleaner filter bag, is connected to the vacuum cleaner filter bag at least one point, and includes at least one part that is not connected to the vacuum cleaner filter bag and that includes part of the boundary of the material layer.

29 Claims, 7 Drawing Sheets

U.S. PATENT DOCUMENTS

| | | | |
|---|---|---|---|
| 2,070,674 A * | 2/1937 | Muentener | 55/367 |
| 2,792,076 A * | 5/1957 | Meyerhoefer | 55/381 |
| 2,848,062 A | 8/1958 | Meyerhoefer | |
| 3,242,654 A * | 3/1966 | Kornstien et al. | 55/376 |
| 3,322,041 A * | 5/1967 | Fesco | 493/220 |
| 3,370,405 A | 2/1968 | Fesco | |
| 3,452,520 A * | 7/1969 | Fesco | 55/367 |
| 3,498,031 A * | 3/1970 | Fesco | 55/368 |
| 4,469,498 A | 9/1984 | Fish | |
| 5,039,324 A | 8/1991 | Goldberg | |
| 5,180,103 A | 1/1993 | Harrison, Jr. et al. | |
| 5,342,420 A * | 8/1994 | Bosses | 96/222 |
| 5,603,741 A | 2/1997 | Frey | |
| 5,647,881 A | 7/1997 | Zhang et al. | |
| 5,766,283 A | 6/1998 | Bumb et al. | |
| 6,171,354 B1 * | 1/2001 | Johnson | 55/309 |
| 7,615,109 B2 * | 11/2009 | Sepke et al. | 96/222 |

FOREIGN PATENT DOCUMENTS

| | | |
|---|---|---|
| DE | 88 11 821.5 U1 | 12/1988 |
| DE | 88 01 638.2 U1 | 7/1989 |
| DE | 90 16 939.5 U1 | 5/1991 |
| DE | 20 2005 009 452 U1 | 9/2005 |
| EP | 0 361 240 A1 | 4/1990 |
| EP | 0 960 645 A2 | 12/1999 |
| EP | 1 068 828 A1 | 1/2001 |
| EP | 1 123 724 A1 | 8/2001 |
| EP | 1 415 699 A1 | 5/2004 |
| EP | 1 685 784 A1 | 8/2006 |
| GB | 815 709 | 7/1959 |
| GB | 1 221 323 | 2/1971 |
| WO | WO 93/21812 A1 | 11/1993 |
| WO | WO 98/17164 A1 | 4/1998 |
| WO | WO 01/26526 A1 | 4/2001 |
| WO | WO 03/073903 A1 | 9/2003 |

* cited by examiner amount of dust DMT type 8 [g]

| | 0 | 50 | 100 | 150 | 200 | 250 | 300 | 350 | 400 |
|---|---|---|---|---|---|---|---|---|---|
| SMS + 30K 90° + St 130CS 2 Punkte | 41.6 | 40.7 | 39.8 | 39.2 | 38.5 | 37.9 | 37.2 | 36.6 | 35.9 |
| SMS + 30K 90° + St 130CS | 41.3 | 39.9 | 39.5 | 38.7 | 38.2 | 37.5 | 36.9 | 36.3 | 35.6 |
| SMS + 30K 90° + St 60SB | 41.4 | 40.3 | 39.5 | 38.6 | 37.9 | 37.1 | 36.4 | 35.7 | 34.9 |
| SMS + 30K | 41.4 | 39.9 | 38.9 | 38.1 | 37.3 | 36.5 | 35.8 | 34.9 | 34.3 |
| SMS | 41.5 | 40.3 | 39.1 | 38.0 | 36.8 | 35.5 | 34.2 | 33.0 | 31.8 |
| SMS + St 130CS | 41.5 | 40.4 | 39.2 | 37.9 | 36.6 | 35.4 | 34.3 | 32.8 | 31.6 |
| SMS + St 60SB | 41.7 | 40.1 | 38.7 | 37.4 | 36.0 | 34.8 | 33.7 | 32.7 | 31.6 | volume flow [l/s]

VACUUM CLEANER FILTER BAG AND USE OF SAID BAG

This application claims the benefit under 35 U.S.C. §371 of International Application No. PCT/EP2006/011191, filed Nov. 22, 2006, which claims the benefit of European Application Nos. 05025480.4, filed Nov. 22, 2005; 05025904.3, filed Nov. 28, 2005; 05027013.1, filed Dec. 9, 2005; 05027219.4, filed Dec. 13, 2005; 06003723.1, filed Feb. 23, 2006; 06004980.6, filed Mar. 10, 2006; and Danish Application No. 10 2006 016 009.6, filed Apr. 5, 2006. These references are incorporated herein in their entirety.

FIELD OF THE INVENTION

The present invention relates to a vacuum cleaner filter bag and to the use of a vacuum cleaner filter bag in a vacuum cleaner.

BACKGROUND

An important aim of the development of vacuum cleaner filter bags is to increase the life-time of the filter bags. The operating period for which a vacuum cleaner filter bag can be used until it has been filled with dust and/or the until the pores of the filter material become clogged should be as long as possible and, simultaneously, the highest possible suction power of the vacuum cleaner is aimed at for this operating period. In order to solve the resultant problems, a great variety of approaches is known from the prior art.

EP 0 960 645, for example, discloses a multi-layer structure of a vacuum cleaner filter bag in the case of which a coarse filter layer is arranged ahead of a fine filter layer in the direction of air flow. Particles sucked into the vacuum cleaner filter bag will thus first impinge on the coarse filter layer which serves to retain in particular larger particles. For this purpose, the coarse filter layer is to be provided with a comparatively high thickness and a large pore volume. Clogging up of the bag can be delayed in this way for a prolonged period of time.

EP 1 123 724 discloses a multi-layer vacuum cleaner filter bag comprising a paper support layer covered on the crude gas side by a pre-filter made of microfibres; said pre-filter is effective as a separating layer and it is adapted to be periodically lifted off the support layer. This separating layer covers the support layer completely so as to guarantee that the filter bag will be sufficiently stable and effective even if the paper layer should be fully destroyed.

U.S. Pat. No. 5,647,881 discloses a vacuum cleaner filter bag having on the inner side thereof a loose diffusion layer that covers the whole inner side of the bag. The diffusion layer serves to protect the downstream filter layer from being damaged by particles impinging thereon with high speed.

A similar aim is to be achieved in WO 93/21812. In the case of this vacuum cleaner filter bag a protective layer in the form of a strip is provided in the interior of the bag; also this protective layer is provided for preventing the vacuum cleaner filter bag from being damaged. Said protective layer is arranged such that particles entering the filter bag through an inlet opening will impinge directly onto said strip so that the subsequent layer will remain protected.

BRIEF SUMMARY OF THE INVENTION

Starting from this prior art, it is the object of the present invention to provide vacuum cleaner filter bags whose life-time has been improved still further so that a vacuum cleaner can be operated with high suction power for a prolonged period of time.

According to the present invention, a vacuum cleaner filter bag with an inlet opening is provided, said vacuum cleaner filter bag comprising
a deflection device
which is arranged in the interior of the vacuum cleaner filter bag in the area of the inlet opening and
which is implemented such that an air current flowing in through the inlet opening can be deflected by the deflection device, and
an air-permeable material layer
which is arranged in the interior of the vacuum cleaner filter bag,
which is connected to said vacuum cleaner filter bag at least one point, and
which includes at least one part that is not connected to the vacuum cleaner filter bag and that includes part of the boundary of the material layer.

Surprisingly enough, it turned out that such a combination of a deflection device and of a material layer comprising a non-connected, i.e. loose part which includes part of the boundary of the material layer leads to a substantial improvement of the lifetime of the vacuum cleaner filter bag. By means of the deflection device it is achieved that an air current flowing in through an inlet opening of the vacuum cleaner filter bag will not impinge directly onto the inner side of the bag located opposite said inlet opening. An incoming air current can thus flow below the material layer, at least part of which is non-connected to the vacuum cleaner filter bag, so that at least part of said material layer will be spaced apart from the inner side of the vacuum cleaner filter bag. In addition, this air current can flow through the material layer away from the bag wall in the direction of the interior of the bag; this results in a very advantageous distribution of the filter cake in the interior of the bag, whereby the lifetime of the vacuum cleaner filter bag will be increased significantly. Hence, the special characteristic is to be seen in that an air current can flow below at least part of the material layer and that said air current can then pass through the material layer into the interior of the bag.

The connection of the material layer at the at least one point can be provided on the material layer side facing the inlet opening and/or on the material layer side facing away from the inlet opening. The non-connected part, however, is connected to the vacuum cleaner filter bag neither on the side facing the inlet opening nor on the side facing away from the inlet opening. The at least one part constitutes a continuous piece of the material layer. The boundary of the material layer comprises the lateral edges of the material layer; if the material layer should e.g. additionally include a slit, the boundary also includes the material layer edges on said slit.

The area of the material layer can be smaller than the area of the inner side of the vacuum cleaner filter bag. This allows an air current to flow below the material layer in an advantageous manner.

The area of said at least one part can amount to at least 20% of the area of the material layer. A sufficiently large size of the non-connected part will increase the above-described effect still further.

The at least one part can form a convex set on a surface of the material layer.

The term convex has the following meaning: a set $M \subset \overline{\mathfrak{R}}^2$ is called convex if for every pair of points P and Q within this set, all the points on the straight line segment that joins P and Q are also within M. It follows that the term convex is used in its traditional sense, which is mentioned e.g. in I. N. Bronstein, K. A: Semendjajew, "Taschenbuch der Mathematik", 25$^{th}$ edition 1991, B. G. Teubner Verlagsgeschellschaft und Verlag Nauka, chapter 3.1.2. Convex sets in the plane include e.g. triangles, rectangles or circular disks. This meaning applies if the material layer in question is planar.

A set M on a two-dimensional, possibly curved surface in a three-dimensional space 3 is called convex if for every pair of points P and Q within this set, all the points on the straight line segment that joins P and Q are also within M. This meaning applies if the material layer in question is curved.

Such a non-connected part of the material layer, which includes part of the boundary of the material layer and which forms a convex set on the surface of said material layer, will guarantee in a particularly suitable manner that an air current will be able to establish a sufficient distance between the material layer and the inner side of the bag and that it will be able to flow below the material layer.

The vacuum cleaner filter bag can be implemented as a flat bag. In this case, the convexity will preferably be judged in the flat condition of the vacuum cleaner filter bag.

The at least one part can include the projection point which results from a perpendicular projection of the geometric centre of gravity of the material layer onto the surface on one side of the material layer.

This means that the non-connected part extends from an boundary of the material layer to the middle thereof. It follows that a comparatively large part of the material layer is non-connected, whereby the effect produced by the material layer in combination with the deflection device will be intensified and the lifetime will be increased still further.

The at least one part can include a straight line segment on the surface, which extends through the projection point and the end points of which define the respective boundary of the material layer.

The term straight line segment means here the shortest connection between the two end points. It follows that said part extends here from one part of the boundary to another part of the boundary. This allows an air current to flow through below the material layer.

The at least one part can include at least 10% of the boundary of the material layer.

Such a lower limit allows a sufficiently large amount of an air current to flow below the material layer so that the desired effect can be achieved.

In particular, said at least one part can include at least 30%, especially at least 50%, especially at least 70%, especially at least 90% and/or especially not more than 95%, especially not more than 70% of the boundary of the material layer.

The at least one part, and in particular the convex set formed thereby, can amount to an area of at least 40%, especially at least 60%, especially at least 80% of the area of the material layer.

In the case of the above-described vacuum cleaner filter bags, the material layer can have a polygonal, in particular a quadrangular shape, and said at least one part can include part of at least two lateral edges of the material layer, said at least two lateral edges being especially opposed lateral edges.

The material layer can be connected to the vacuum cleaner filter bag at a predetermined number of points, preferably at precisely two points, and/or along two seams of the vacuum cleaner filter bag.

These variants allow a simple production of the vacuum cleaner filter bag and they also allow an air current to flow below the material layer in an advantageous manner.

In particular, the material layer can be rectangular in shape and it can be connected to the vacuum cleaner filter bag only along two, especially two opposed lateral edges, said lateral edges being in particular the short sides.

In the case of the above-described vacuum cleaner filter bags, the material layer can be glued or welded to the vacuum cleaner filter bag, in particular to the inner side of the bag.

Furthermore, the material layer can comprise a nonwoven fabric, comprising e.g. a meltblown, a spunbond, a wet-laid nonwoven and/or a dry-laid nonwoven, a paper or an air-permeable foil, e.g. a perforated or slitted foil.

The strip of material can have an air permeability of 100-10000 l/(m² s), more preferably of 1000-8000 l/(m² s), and most preferably of 1500-5000 l/(m² s).

The area of the material layer of the vacuum cleaner filter bags can correspond to 10-80%, preferably 15-30% of the area of the inner side of the bag.

This has the effect that, on the one hand, the area of the inner side of the vacuum cleaner filter bag covered by the material layer is not excessively large, so that the filtering function of the bag wall will not be impaired as far as possible, and that, on the other hand, the material layer below which an air current can flow and which can be caused to move by said air current is sufficiently large.

In the case of the above-described vacuum cleaner filter bags, the material layer can be connected to the vacuum cleaner filter bag in opposed relationship with the inlet opening of said vacuum cleaner filter bag.

In combination with the deflection device arranged in part of the inlet opening, this will have the particularly advantageous effect that an air current flowing in through the inlet opening and exiting from an exit opening of the deflection device will not impinge directly on the surface of the strip of material facing the interior of the vacuum cleaner filter bag and the inlet opening. Depending on the structural design of the vacuum cleaner filter bag, it will, however, also be possible to choose other modes of arrangement of the material layer by means of which this kind of effect is achieved. In block bottom bags, for example, the material layer may be arranged on a side wall which is not located opposite the inlet opening.

In the case of the above-described vacuum cleaner filter bags, the at least one part can be provided with at least one slit. The flow of the air current below the material layer will be supported still further by such a slit. When the material layer has at least one slit, in particular a slit of great length, the material layer can e.g. fully cover the inner side of the vacuum cleaner filter bag. The at least one slit will then nevertheless guarantee a flow of the air current below the material layer. The material layer may especially have a plurality of slits. In the case of a flat bag, the material layer can, provided that it has at least one slit, fully cover a bag wall, in particular the bag wall that is located opposite to the inlet opening.

The vacuum cleaner filter bag can be implemented as a flat bag comprising two rectangular filter material layers interconnected along the boundary. In this case, the air-permeable material layer can be connected, especially centrally connected to the filter material layer located opposite the inlet opening of the vacuum cleaner filter bag. In particular, the material layer can have a rectangular shape whose width corresponds to 10-80%, preferably 25-45% of the width of the filter material layer connected thereto and/or whose length corresponds to 60-100%, preferably 100% of the length of the filter material layer connected thereto.

In the above-described vacuum cleaner filter bags, the material layer can comprise at least one laminate, especially an SMS. In a laminate a plurality of material layers are connected to one another. In an SMS, for example, a spunbond, a meltblown and a spunbond are connected to one another.

The material layer can comprise a fibre net of films. Such fibre nets of films are formed e.g. in the case of a fibrillation of extruded foils and they are a pre-stage of film nonwovens or film fibre nonwovens (cf. e.g. "Vliesstoffe", W. Albrecht, F. Fuchs and W. Kittelmann, Wiley VCH, Weinheim, 2000).

The material layer can comprise a fibre net of films. Such a fibre net can be obtained by extrusion and by depositing the fibres in a suitable manner.

Alternatively, the material layer in the above-described vacuum cleaner filter bags can comprise individual fibres which are not connected to one another, or it can consist of individual fibres which are not connected to one another. The directions of the longitudinal axes of said individual non-connected fibres can enclose an angle of less than 45° relative to one another, i.e. the fibres can especially be arranged parallel to one another.

The terms non-connected individual fibres and individual fibres which are not connected to one another should here be interpreted such that the fibres are not connected to one another essentially along their longitudinal direction. This formulation should, however, not exclude that they may be locally connected to one another via the at least one connection point with the vacuum cleaner filter bag.

The fibres referred to in this application have comparatively great fibre lengths ranging from a few centimeters to the length or the width of the vacuum cleaner filter bag. The fibres which are not connected to one another can be staple fibres, in particular staple fibres consisting of polypropylene.

In particular, the fibres can be oriented essentially parallel to the direction of the air current at the inlet opening, prior to deflection by the deflection device, or perpendicular to this direction, or they can be oriented such that they are essentially parallel to one another and enclose an angle between 0° and 90° relative to this direction. It follows that, in the case of a rectangular vacuum cleaner filter bag, the fibres can be arranged especially parallel to one of the edges. These individual fibres can be arranged side by side in spaced or non-spaced relationship with one another or such that they overlap one another.

Each of the fibres has a first and a second end in the longitudinal direction of the fibres and can be connected to the vacuum cleaner filter bag at said first end as well as at said second end. The connection can especially be established by a connection extending transversely across the ends, such as a transversely extending welding seam or glue line. Quite generally, all the fibres or a few of the fibres can be connected to the vacuum cleaner filter bag through one or a plurality of line- or area-shaped connections perpendicular to the longitudinal direction of the fibres. The line- or area-shaped connections can, alternatively, extend at angle of less than 90° to the longitudinal direction of the fibres. The individual, otherwise non-connected fibres can be connected to one another via these line- or area-shaped connections which serve to connect the fibres to the vacuum cleaner filter bag.

Individual fibres represent an advantageous embodiment of the air-permeable material layer insofar as they can be produced easily and at a reasonable price, are highly permeable to air, and will easily allow the air current, which flows in through the inlet opening and which is deflected by the deflection device, to flow below the material layer and to move said material layer, which consists of the fibres or comprises said fibres, to a spaced-apart position. By means of the orientation of the fibres and their mutual spacing, the air current can be finely regulated.

Furthermore, the above-described vacuum cleaner filter bags can comprise an additional air-permeable material layer which is arranged in the interior of the vacuum cleaner filter bag and which is connected to the vacuum cleaner filter bag and/or the other air-permeable material layer at least one point, said additional air-permeable layer comprising at least one part which is not connected to the vacuum cleaner filter bag and/or the other air-permeable material layer and which includes part of the boundary of the material layer.

By means of such an additional material layer the above-described effect of the other, i.e. first material layer can be intensified still further. In particular, a part of an air current can also flow between the two material layers. The two material layers can be connected to the vacuum cleaner filter bag e.g. along two seams of said filter bag. In addition, one of the material layers or both said material layers can be provided with at least one slit. The two material layers can, for example, each be provided with at least one slit at respective different positions. These material layers can be arranged at different positions or one on top of the other in the vacuum cleaner filter bag.

In the vacuum cleaner filter bags, the deflection device can surround the inlet opening of the vacuum cleaner filter bag at least partially and it can be secured to the inner side of the bag. This has especially the effect that a stable mode of arrangement of the deflection device, which will be able to reliably fulfil its function even at high flow speeds, will be obtained.

In particular, the deflection device can be implemented such that it divides the air current into at least two subcurrents.

By means of such a division into two or more subcurrents, a more uniform distribution of the filter cake in the vacuum cleaner filter bag will be achieved. In addition, the number of particles per subcurrent is reduced in comparison with the number of particles in the incoming air current, whereby the load on the bag walls caused by the individual subcurrents will be reduced.

The deflection device can be implemented such that it divides the air current into at least two subcurrents with opposite directions of flow.

In the case of the deflection device according to the present invention, air enters the deflection device through an entrance opening thereof with a certain direction of flow (incoming direction of flow) and is deflected in said deflection device so that the direction of flow changes in the deflection device with respect to the direction of flow at the entrance opening. The term direction of flow of the air current or direction of air flow stand for the main direction of flow of the air which extends normally parallel to a wall of e.g. a vacuum cleaner tube or connecting piece. When the vacuum cleaner is in operation, such a main direction of flow occurs at any point through the vacuum cleaner tube up to and into the bag, even though turbulences may perhaps occur at individual points.

Opposite directions of flow means that both directions of flow have a component in the plane that extends perpendicular to the direction of flow with which an air current enters the deflection device, i.e. a component perpendicular to the incoming flow direction, the two components enclosing an angle of approx. 180° and the components in this plane being larger than the respective component parallel to the incoming flow direction. This means that (in a vectorial representation of the direction of flow) the two directions of flow of the subcurrents are arranged antiparallel in the perpendicular projection in the plane extending perpendicular to the incoming flow direction.

The deflection device can comprise at least one, preferably planar deflection surface which is arranged in opposed relationship with the entrance opening. Such a deflection surface or baffle can especially be used for reducing the speed of the particles in a suitable manner. A deflection surface located opposite the entrance opening of the deflection device can especially be spaced apart from said entrance opening at a distance or a mean distance of from 1 cm to 15 cm, in particular of from 2 cm to 5 cm.

The area of the at least one deflection surface can correspond to, or can be larger than the area of the entrance opening. In this way, an air current can largely be prevented from being simply directed around the deflection surface and from impinging then with a substantially unchanged flow velocity onto the bag wall located opposite the entrance opening. Instead, the identically dimensioned or larger dimensioned surface has the effect that the air current will be deflected such that it can flow below the material layer in a suitable manner. Each deflection surface can have an area of from 15 cm$^2$ to 100 cm$^2$, in particular of from 40 cm$^2$ to 60 cm$^2$.

The at least one deflection surface can be arranged at a predetermined angle relative to the plane of the entrance opening.

By choosing a suitable angle, the deflection of the air current can be adapted to various parameters, such as the motor power of the vacuum cleaner, the arrangement of the vacuum cleaner filter bag as well as the geometry and the dimensions of the latter, the inflow angle, the arrangement and the dimensions of the material layer, etc., and it can be optimized.

When the deflection surface is arranged parallel to the plane of the entrance opening, an air current flowing in at right angles to the plane of the entrance opening will be redirected or deflected by up to 90°, and this will support the flow of said air current below the material layer in an advantageous manner. The deflection surface can especially be arranged at right angles to the incoming flow direction or parallel to the plane of the entrance opening of the deflection device.

The deflection device can be implemented such that an air current entering the deflection device can be deflected by at least 45°, preferably by at least 60°, more preferably by at least 80°, in said deflection device.

This means that the direction of flow of the air current exiting from the deflection device will enclose with the direction of flow of the air current entering the deflection device an angle of at least 45°. This leads to an advantageous direction of air flow into the vacuum cleaner filter bag.

The deflection device can have the shape of a cylinder, a truncated cone, a rectangular parallelepiped or a frustum of pyramid having an entrance opening in its top surface and at least one exit opening in its sidewall.

By means of these shapes a stable structural design of the deflection device is achieved, and the base located opposite the entrance opening defines simultaneously a suitable deflection surface or baffle for rerouting the air current.

The deflection device of the above-described vacuum cleaner filter bags can be implemented such that, when occupying a first position, its dimensions in a direction perpendicular to the plane of the inlet opening will be smaller than the dimensions existing when said deflection device occupies a second position.

This means that the deflection device is collapsible. The smaller dimensions at a second position allow the vacuum cleaner filter bag to be folded into a very compact shape, especially before it is used. This is particularly advantageous in the case of flat bags that can be folded to specific sizes especially for the purpose of packaging. On the basis of such collapsible deflection devices it can be avoided that the thickness of the folded bags is substantially increased. Preferably, the deflection device can be implemented substantially flat at the second position.

The above-described deflection device can be implemented such that it is adapted to be moved from said first position to said second position by a suction air current.

This means that, while being transported, the vacuum cleaner filter bag can comprise a smaller-dimensioned deflection device at the second position which will then, when the filter bag is in operation within the vacuum cleaner, be transferred to its operating position, e.g. due to the negative pressure generated within the bag as a result of the air sucked into said bag; at said operating position it will fulfil its deflecting function.

The deflection device can comprise a spring element which applies a restoring force to a part of the deflection device in such a way that the deflection device is adapted to be moved from said second position to said first position in dependence upon a suction air current.

Such a spring element allows the deflection device to return from the first position to the second position with smaller dimensions perpendicular to the plane of the inlet opening, when the suction air current becomes weaker, e.g. when the vacuum cleaner is switched off.

The deflection device can have fold lines so that the deflection device is adapted to be moved from said first or second position to said second or first position. Making use of such fold lines, the desired folding up can be executed easily and reliably.

In the case of the above-described vacuum cleaner filter bag, the deflection device can have the shape of a rectangular parallelepiped having a flow-in opening in the top surface surrounding the inlet opening, and having an exit opening in a lateral face, said exit opening being as large as the whole lateral face and the fold lines being provided at the lateral edges at right angles to the lateral face of the exit opening, the vacuum cleaner filter bag can be implemented as a flat bag, the material layer can be quadrangular in shape and connected to the vacuum cleaner filter bag in opposed relationship with the inlet opening, and the deflection device can be arranged in such a way that, in the flat condition of the vacuum cleaner filter bag, one of the fold lines encloses with a boundary, included in the non-connected part, an angle of at least 15°.

The angle enclosed can, in particular, be an angle of at least 30°, in particular at least 45°, in particular at least 60°, in particular 90°. Such an arrangement of the deflection device relative to the material layer will guarantee that a substantial part of the air current deflected in the deflection device will be able to flow below the material layer. The boundary with which the angle is enclosed preferably includes a lateral edge of the material layer.

In the above-described vacuum cleaner filter bags, the deflection device can additionally be implemented for closing the entrance opening and/or the inlet opening.

This means that an additional closure element, which is often provided on a support plate secured to the outer side of the vacuum cleaner filter bag, will be avoided, whereby the structural design and the production of the vacuum cleaner filter bag will be simplified to an essential extent.

Alternatively to the above-described further developments, the deflection device may, however, also be implemented as a rigid component so that it cannot be collapsed.

The deflection device of the above-described vacuum cleaner filter bags can comprise an essentially air-impermeable material, in particular a plastic material, a dry- or wet-laid nonwoven fabric, a paper, in particular a cardboard, or a foil.

This has the advantage that an air current and the entrained particles will essentially be fully deflected so that no particles will be deposited, especially not on the deflection device. Materials other than the above-mentioned ones can be used as well; in this respect, a sufficient stiffness will especially be of advantage so as to avoid an excessive movement of the deflection device through the air current.

The deflection device can especially be welded or glued to the filter material of the vacuum cleaner filter bag.

The present invention additionally provides the use of a vacuum cleaner filter bag with a material layer in a vacuum cleaner with a deflection device which is implemented as part of a connecting piece for a vacuum cleaner, which further comprises a connection means for connecting the deflection device to a fitting which, in turn, connects the vacuum cleaner filter bag to a suction tube of the vacuum cleaner, wherein the connection means and the deflection device are implemented such that, when the vacuum cleaner is in operation, the deflection device is arranged in the interior of the vacuum cleaner filter bag and that an air current flowing into the connection means will be deflected in the deflection device, and wherein the material layer is arranged in the interior of the vacuum cleaner filter bag, is connected to said vacuum cleaner filter bag at least one point, and comprises at least one part which is not connected to the vacuum cleaner filter bag and which includes part of the boundary of the material layer.

Analogously to the case of the above-described vacuum cleaner filter bag, the surprising and advantageous effect is also achieved when a vacuum cleaner filter bag with a material layer is used, as described here, in combination with a deflection device provided on the vacuum cleaner side.

In the case of this use of a vacuum cleaner filter bag, the material layer and the deflection device can be further developed analogously to the above-described vacuum cleaner filter bags.

In particular, the area of the material layer can be smaller than the area of the inner side of the vacuum cleaner filter bag. Furthermore, the area of the at least one part can correspond to at least 20% of the area of the material layer.

The at least one part can form a convex set on a surface of the material layer.

In the case of said use, the at least one part can, furthermore, include the projection point which results from a perpendicular projection of the geometric centre of gravity of the material layer onto the surface on one side of the material layer.

In particular, the at least one part can include a straight line segment on said surface which extends through the projection point and the end points of which are in contact with the respective boundary of the material layer.

In the above-mentioned cases of use, the at least one part can include at least 10% of the boundary of the material layer.

In particular, said at least one part can include at least 30%, especially at least 50%, especially at least 70%, especially at least 90% and/or especially not more than 95%, especially not more than 70% of the boundary of the material layer.

The convex set can amount to an area of at least 40%, especially at least 60%, especially at least 80% of the area of the material layer.

The material layer can, when used, have a polygonal, in particular a quadrangular shape, and said at least one part can include part of at least two lateral edges of the material layer, said at least two lateral edges being especially opposed lateral edges.

In the above-described cases of use, the material layer can be connected to the vacuum cleaner filter bag at a predetermined number of points, preferably at precisely two points, and/or along two seams of the vacuum cleaner filter bag.

The material layer can be rectangular in shape and it can be connected to the vacuum cleaner filter bag only along two, especially two opposed lateral edges, said lateral edges being in particular the short sides.

Furthermore, the material layer can be glued or welded to the vacuum cleaner filter bag, in particular to the inner side of the bag.

In the above-described cases of use, the material of the material layer can comprise a paper, a nonwoven fabric, comprising especially a meltblown, a spunbond, a wet-laid nonwoven and/or a dry-laid nonwoven, or an air-permeable foil.

The area of the material layer can correspond to 10-80%, preferably 15-30% of the area of the inner side of the vacuum cleaner filter bag connected thereto.

In the above-described cases of use, the material layer can be connected to the vacuum cleaner filter bag in opposed relationship with the inlet opening of said vacuum cleaner filter bag.

In the above-described cases of use, the at least one part of the material layer can be provided with at least one slit.

In the above-described cases of use, the vacuum cleaner filter bag can, in particular, be implemented as a flat bag comprising two rectangular filter material layers interconnected along the boundary. In this case, the air-permeable material layer can be connected, especially centrally connected to the filter material layer located opposite the inlet opening of the vacuum cleaner filter bag. In particular, the material layer can have a rectangular shape whose width corresponds to 10-80%, preferably 25-45% of the width of the filter material layer connected thereto and/or whose length corresponds to 60-100%, preferably 100% of the length of the filter material layer connected thereto.

In the above-described cases of use, the material layer can comprise at least one laminate, especially an SMS. In a laminate a plurality of material layers are connected to one another. In an SMS, for example, a spunbond, a meltblown and a spunbond are connected to one another.

The vacuum cleaner filter bags in the above-described cases of use can comprise a material layer comprising individual fibres which are not connected to one another or a fibre net of films, or consisting of these fibres.

The directions of the longitudinal axes of said individual non-connected fibres can enclose an angle of less than 45° relative to one another, and at least a part of the individual fibres can be arranged side by side in spaced or non-spaced relationship with one another or such that they overlap one another.

At least part of said fibres can be connected at both fibre ends to the vacuum cleaner filter bag in the longitudinal direction of the fibres, and/or a part of said fibres can be connected to the vacuum cleaner filter bag through one or a plurality of line- or area-shaped connections.

Furthermore, the vacuum cleaner filter bags used in said cases of use can comprise an additional air-permeable material layer which is arranged in the interior of the vacuum cleaner filter bag and which is connected to the vacuum cleaner filter bag and/or the other air-permeable material layer at least one point, said additional air-permeable layer comprising at least one part which is not connected to the vacuum cleaner filter bag and/or the other air-permeable material layer and which includes part of the boundary of the material layer.

The deflection device can be implemented such that it divides the air current into at least two subcurrents.

In particular, the deflection device can be implemented such that it divides the air current into at least two subcurrents with opposite directions of flow.

According to a further development of the above-described cases of use, the deflection device can have the shape of a cylinder, a truncated cone, a rectangular parallelepiped or a frustum of pyramid having an entrance opening in its top surface and at least one exit opening in its sidewall.

The deflection device can, in particular, comprise at least one, preferably planar deflection surface which is arranged in opposed relationship with the entrance opening. The area of the at least one deflection surface can correspond to, or be larger than the area of the entrance opening. In particular, the at least one deflection surface can be arranged at a predetermined angle relative to the plane of the entrance opening.

In the above-described cases of use, the deflection device can comprise an essentially air-impermeable material, in particular a plastic material, a dry- or wet-laid nonwoven fabric, paper, in particular cardboard, or a foil.

The above-described features of the vacuum cleaner filter bag and of the use of said vacuum cleaner filter bag can also be combined independently of one another in a way other than that explicitly described hereinbefore.

BRIEF DESCRIPTION OF THE DRAWINGS

Additional features and advantages of the present invention will be described in the following on the basis of the drawings, in which.

DETAILED DESCRIPTION OF THE INVENTION

Figure 1:
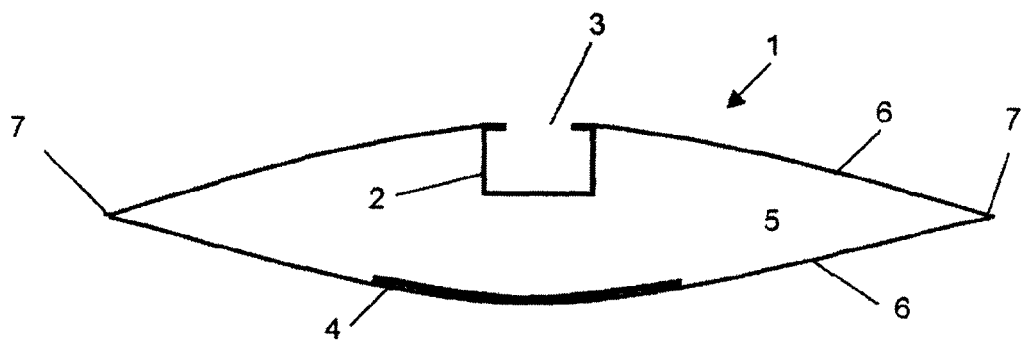
FIG. 1 shows a cross-sectional view of a vacuum cleaner filter bag comprising a deflection device and a material layer.

FIG. 1 shows a highly schematic representation of a vacuum cleaner filter bag 1 with a deflection device 2 which is arranged in the interior of the vacuum cleaner filter bag 1 in the area of the inlet opening 3 of the filter bag 1. Furthermore, the vacuum cleaner filter bag comprises an air-permeable material layer 4 in the form of a strip of material which, in opposed relationship with the inlet opening 3, is connected to the inner surface 5 of the vacuum cleaner filter bag.

In the example shown, the vacuum cleaner filter bag 1 is implemented in the form of a flat bag. Such a flat bag is obtained, when e.g. two rectangular filter material layers 6 are interconnected along their lateral edges e.g. by means of glueing or welding, so that a seam 7 will be formed along each of said lateral edges. Suitable filter materials are e.g. nonwoven fabrics and/or conventional types of filter paper. In particular, a multi-layer structure can be used, this type of structure being described e.g. in EP 0 960 645. In the example shown, the material layer 4 is centrally connected to the filter material layer 6, which is located opposite to the inlet opening.

The deflection device 2 has, in the case of the example shown, the form of a rectangular parallelepiped in the case of which two respective lateral faces each have an exit opening which is as large as the whole lateral face. In the example shown, the exit openings are arranged parallel to the drawing plane so that an air current entering the deflection device 2 through the inlet opening will be divided into two subcurrents having opposite directions of flow, said subcurrents exiting from the deflection device in a direction away from the drawing plane and in a direction into the drawing plane. A deflection device of this kind will be described hereinbelow in more detail on the basis of FIGS. 2 and 3.

The strip of material 4 can be connected to the vacuum cleaner filter bag in a great variety of different ways, as long as an air current is allowed to flow between the material layer and the inner side of the bag. Examples of various possibilities of connecting the material layer to the vacuum cleaner filter bag, in particular to the inner side of the bag, will be explained on the basis of FIG. 6A to 6F. The material layer may e.g. consist of a spunbond or an SMS. Other materials may, however, be used as well, as will be explained hereinbelow with reference to FIG. 8 to 10.

Figure 2:
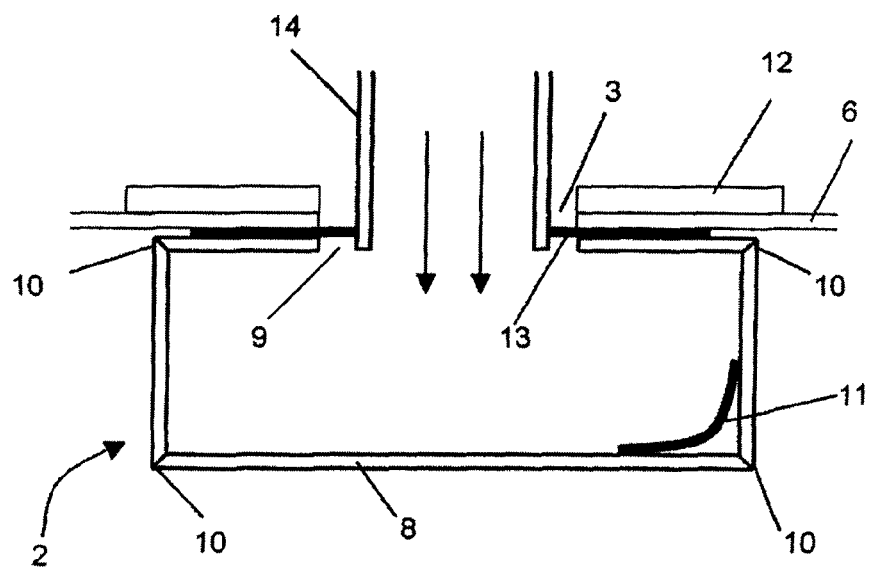
FIG. 2 shows an enlarged view of a deflection device in a cross-sectional representation.
Figure 3:
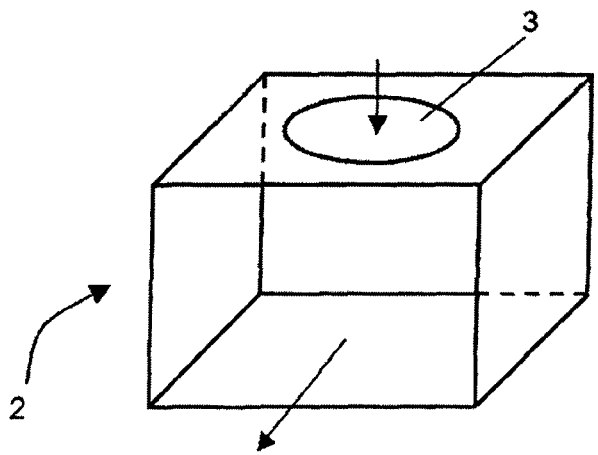
FIG. 3 shows a perspective view of a deflection device.

FIG. 2 shows schematically a cross-sectional view of an example of a deflection device having the shape of a rectangular parallelepiped. FIG. 3 is a perspective view of such a deflection device in which a few details of FIG. 2 have been omitted.

The base 8 of the parallelepiped-shaped deflection device 2 is arranged parallel to the plane of the inlet opening 3 and parallel to the plane of the entrance opening 9 of the deflection device and fulfills the function of a deflection surface or baffle. Two of the lateral faces extending at right angles to the baffle have an exit opening, each of said exit openings being as large as the whole lateral face of the rectangular parallelepiped. The two other lateral faces (on the left and on the right-hand side in the view shown) are closed. This has the effect that an air current which enters through the inlet opening 3 and the entrance opening 9 will be subdivided into two subcurrents which are deflected relative to the flow-in opening by 90° and which flow to the rear and to the front (in the view shown) into the bag.

The dimensions of the parallelepiped-shaped deflection device can be 8 cm×8 cm×3 cm (width×depth×height) in the example shown. The material can be cardboard, by way of example.

In the example shown, the deflection device 2 is implemented such that it can be moved from a first to a second position. For this purpose, fold lines 10 are provided at the edges between the base 8 and the two lateral faces as well as between the lateral faces and the top surface; these fold lines allow the deflection device to be folded up so as to reduce the dimensions of said deflection device in a direction perpendicular to the plane of the inlet opening. Vacuum cleaner filter bags equipped in this way can be folded compactly into this position and transported.

In the example shown, an (optional) spring element 11 is additionally provided, which is here implemented in the form of a bending spring. When there is a suction air current, which is generated e.g. by sucking in air and generating thus a negative pressure in the interior of the bag, the deflection device 2 will be unfolded, against the restoring force of the bending spring 11, and assume its parallelepiped shape. When the suction air current is weak or is about to vanish, the effect produced by the bending spring 11 will be such that the lateral faces and the base 8 are folded to the side (to the left-hand side in the view shown) so that the deflection device is folded flat. In the folded flat condition, the right lateral face will then be located essentially in one plane with the base 8. The bending spring 11 can e.g. be glued to the base and the right lateral face. Alternatively, the bending spring can be clamped in position between two layers of material (e.g. cardboard) which define the base 8 and the lateral face.

Such a collapsible deflection device can especially also be used for reliably closing the inlet opening and the entrance opening. It is therefore not necessary to use an extra closure element.

The outer side of the vacuum cleaner filter bag 1 is connected to a support plate 12 by means of which the filter bag can be fixed in a vacuum cleaner housing. This support plate can e.g. be glued or welded to the filter material 6.

Alternatively to the bending spring 11, it is e.g. also possible to provide a permanent magnet in or on the support plate 12 and a ferromagnetic element in or on one of the lateral faces or the base 8 of the deflection device. This is another possibility of forming a restoring means which allows the deflection device to be collapsed when the suction air current becomes weaker.

As can be seen from the example, a sealing element 13 can additionally be provided; this sealing element is here arranged between the deflection device and the inner side of the bag. Alternatively, the sealing element can also be arranged within the deflection device on the upper surface in which the entrance opening 9 is formed. The sealing element 13 is provided such that it extends fully around the inlet opening 3. This sealing element 13 especially serves the purpose of achieving an adequate sealing effect after insertion of a connecting piece 14 which establishes a connection to a vacuum cleaner tube. The sealing element may comprise e.g. an elastomer, a rubber or a closed-cell foam.

The deflection device can be connected to the inner side of the bag in various ways. According to one possibility, the deflection device is glued to the inner wall of the bag. Alternatively, the upper side of a deflection device, which consists e.g. of cardboard, can be coated with PP (polypropylene), so that when a PP support plate is welded to the filter bag by means of ultrasonic welding, the deflection device will simultaneously be welded to the wall of the bag.

Alternatively to the above-described parallelepiped shape, the deflection device may also have some other shape. Possible shapes are e.g. that of a truncated cone, a frustum of pyramid or a cylinder.

In the above-described embodiments, the deflection device is provided on the side of the bag, i.e. the vacuum cleaner filter bag itself comprises the deflection device. An alternative embodiment is illustrated in FIGS. 4 and 5, which schematically illustrate a connecting piece for a vacuum cleaner with which a vacuum cleaner filter bag comprising a material layer arranged in the way described can be used.

Figure 4:
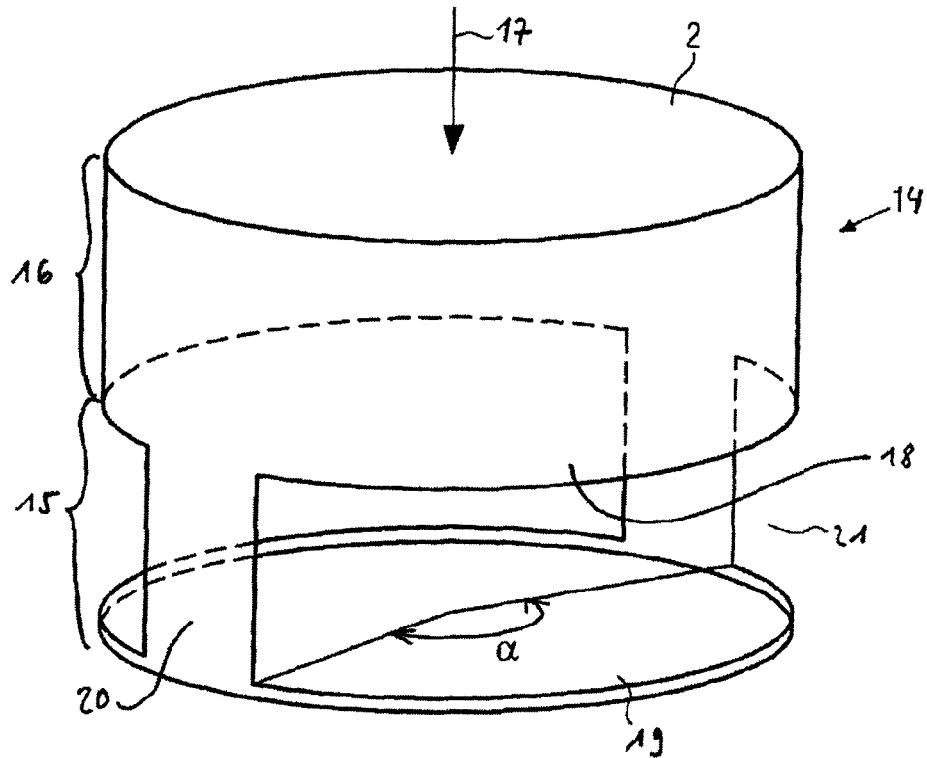
FIG. 4 shows a perspective view of a connecting piece for a vacuum cleaner.
Figure 5:
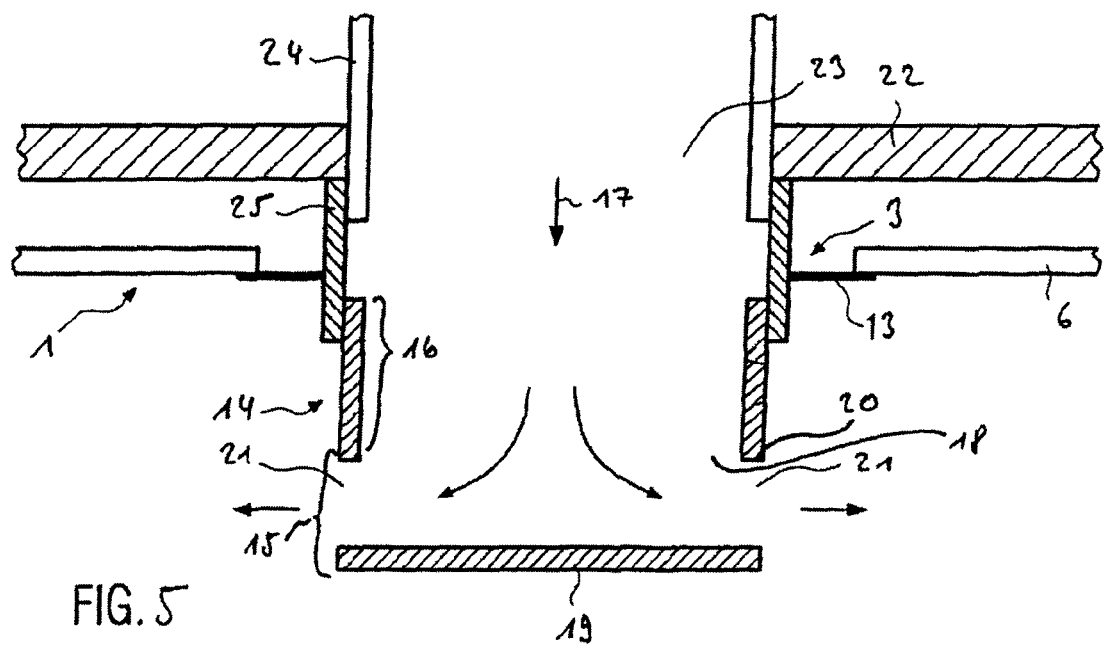
FIG. 5 shows a cross-sectional view of a connecting piece in a vacuum cleaner housing.

FIG. 4 shows schematically a cylindrical connecting piece 14 for a vacuum cleaner with a deflection device 15 and a connection means 16. The connecting piece shown can be provided e.g. as a retrofitting element for conventional vacuum cleaners.

When the vacuum cleaner comprising such a connecting piece is in operation, an air current enters the connection means 16 with a direction of flow that it schematically indicated by the arrow 17. The connection means 16 serves to establish a connection between the connecting piece 14 and a vacuum cleaner fitting (not shown). The deflection device 15 has an entrance opening 18 through which an air current flows from the connection means 16 of the connecting piece into the deflection device 15.

Analogously to the example shown in FIG. 2, a planar deflection surface 19 is arranged in opposed relationship with the entrance opening and parallel to the plane of said entrance opening 18, said deflection surface being defined by the base of the cylinder. The sidewall 20 of the cylindrical deflection device 15 has provided therein two opposed exit openings 21.

In the embodiment shown, the connecting piece 14 is implemented as an integral component, e.g. as an injection moulded part. When seen in the direction of air flow 17, the connection means 16 ends directly above the upper edge of the exit openings 21. Hence, the sidewall 20 of the deflection device 15 only comprises a narrow boundary region above the exit openings 21.

In the embodiment shown, two exit openings are provided in the cylindrical connecting piece. Alternatively, it is, however, also possible to provide a different number of exit openings, e.g. only one exit opening or more than two exit openings. In addition, the connecting piece may also have the shape of a rectangular parallelepiped, a frustum of pyramid or a truncated cone.

FIG. 5 shows the arrangement of a connecting piece 14, of the type shown in FIG. 4, in a vacuum cleaner housing in a schematic cross-sectional view. The wall 22 of the vacuum cleaner housing is provided with an opening 23 for receiving therein a connection piece 24 of a suction tube or of a vacuum cleaner hose. Such a connection piece 24 can be inserted in said opening 23 where it can be fixed e.g. by means of a snap fit. Hence, the connection piece 24 is then also positioned in the vacuum-cleaner fitting 25 provided on the side of the vacuum cleaner.

The fitting 25 is connected to, e.g. glued to the wall 22 of the vacuum cleaner housing. Alternatively, the fitting 25 can also be formed integrally with the wall 22. As a further alternative, the fitting 25 can also be arranged on the wall 22 such that it can be released therefrom in a non-destructive manner; this kind of connection can be established e.g. by screw-fastening the connecting piece to the wall. The fitting 25 engages the inlet opening 3 of vacuum cleaner filter bag 1. It follows that the fitting 25 according to FIG. 5 corresponds to the connecting piece 14 in FIG. 2.

In the embodiment depicted in FIG. 5, the support plate, by means of which the vacuum cleaner filter bag is fixed in the vacuum cleaner, is not shown.

The connecting piece 14 can be connected to the fitting 25 in a great variety of different ways. The connecting piece 14 can e.g. be pushed onto the outer surface of the fitting 25 or it can be screw-fastened to said outer surface. Alternatively, the deflection device can also be inserted in the fitting (as shown in the figure) or screw-fastened thereto. Furthermore, it is also possible to interconnect the fitting and the connecting piece by means of an adhesive or by means of welding. According to another alternative, the fitting and the connecting piece can be formed as an integral component, e.g. as an injection-moulded part.

The connecting piece 14 comprises a connection means 16 and a deflection device 15. The connection means 16 opens into the entrance opening 18 of the deflection device 15, when seen in the direction of flow 17.

When the vacuum cleaner is in operation, an air current is sucked in through a vacuum cleaner tube or a vacuum cleaner hose. The direction of flow of this air current is, especially within the vacuum cleaner hose or tube, parallel to the wall. In the example shown in FIG. 5, the direction of flow is also parallel to the wall of the connection piece 24 as well as of the fitting 25 when the air current enters the vacuum cleaner housing and the fitting, as is schematically indicated by arrow 17, even though turbulences may locally occur at individual points of the air current.

By means of the deflection surface or baffle 19 of the deflection device 15, the air current is subdivided into two subcurrents whose directions of flow have been rotated, as indicated by the respective arrows, by approx. 90° at the exit openings 21 relative to the direction in which the air current flows upon entering the connection means 16. Furthermore, the directions of flow are opposed to one another at the exit openings.

In FIG. 6A to 6F various possibilities of connecting a material layer to a vacuum cleaner filter bag are schematically illustrated. Each of said figures shows a top view of an inner side 5 of the bag. The side in question is the side of a rectangular filter material layer for a flat bag which faces the interior of the bag, said filter material layer being positioned in opposed relationship with the inlet opening of the bag in the fully assembled vacuum cleaner filter bag. This filter material layer is e.g. welded to the opposed filter material layer, in which the inlet opening is formed, along the lateral edges so that a seam 7 is formed along each of said edges.

Figure 6A:
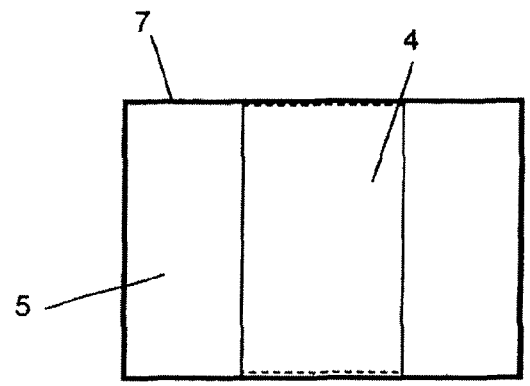
FIG. 6A to 6H show top views of the inner side of a vacuum cleaner filter bag with a material layer arranged on said inner side.

In FIG. 6A a material layer 4 in the form of a rectangular strip is arranged centrally on the inner side 5 of the bag. The material layer has an area that corresponds to approx. one third of the area of the filter material layer connected thereto (bag wall) and, consequently, an area that corresponds to approx. one sixth of the inner side of the whole vacuum cleaner filter bag. In the present example, the material layer is connected to the vacuum cleaner filter bag only along two seams of said filter bag, said seams being located at the top and at the bottom in the view shown. This can be accomplished e.g. in that the material layer 4 is placed between the two filter material layers when the vacuum cleaner filter bag is being produced, and in that it is welded to the two filter material layers when they are being welded together along the lateral edges. In this way, the material layer is connected to the vacuum cleaner filter bag through two continuous welding seams.

The two other, lateral edges (on the left- and on the right-hand side in the view shown) are, however, not connected to the filter material layer so that an air current entering the vacuum cleaner filter bag will be able to flow between the material layer 4 and the bag inner side 5 of the filter material layer located opposite the inlet opening. In this way, the material layer will be raised when the vacuum cleaner is in operation, i.e. it will be removed from the filter material layer and caused to move. The air current can flow from below through the material layer in the direction of the interior of the vacuum cleaner filter bag. Surprisingly enough, it turned out that this will lead to a much longer lifetime and much better dust holding capacity of the bag over a prolonged period of time, as will be explained in the following on the basis of FIG. 8 to 13.

Through the connection of the material layer and the vacuum cleaner filter bag shown in FIG. 6A, the surface of the material layer has, on the side facing the filter material layer connected thereto, a non-connected part which is represented by a broken line. This part includes the left and the right lateral edge of the material layer with the exception of the corners thereof and forms a convex set in the form of a rectangle. This convex set amounts to almost the whole area (with the exception of the welding seam at the upper and lower edges) of the area of the material layer.

Figure 6B:
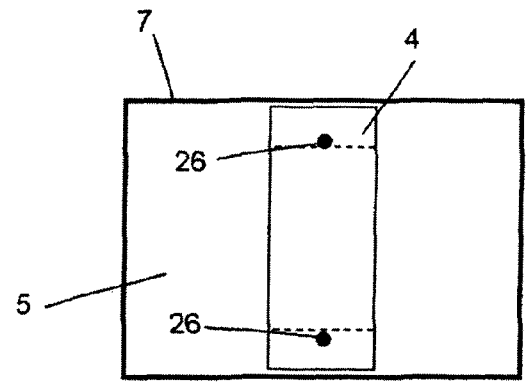

In the example according to FIG. 6B, the material layer 4 is connected to the inner side 5 of the bag only at two points 26. These points can e.g. be welding spots or glue dots. In the embodiment shown, the strip of material is again centrally arranged, but it does not extend up to the seams 7 of the vacuum cleaner filter bag in the longitudinal direction. In the example shown, a convex set, which is formed by the non-connected part of the surface of the material layer and which is located between the two connection points, is again indicated by a broken line. Just as in the example according to FIG. 6A, the non-connected part includes the perpendicular projection of the centre (geometric centre of gravity) of the material layer onto the material layer surface facing away from the inlet opening as well as a straight line segment extending through this projection point and from the left to the right boundary of the material layer. In this way, an air current can flow through below the material layer.

Figure 6C:
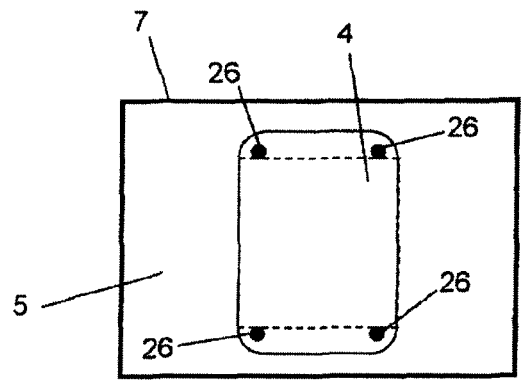

The strip of material 4 in FIG. 6C has rounded corners and is connected to the bag inner side 5 of the vacuum cleaner filter bag at four points 26.

Figure 6D:
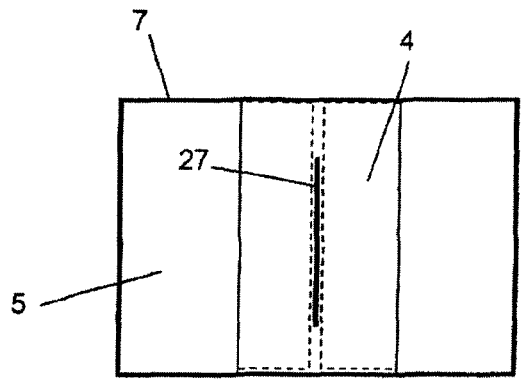

In FIG. 6D, the material layer 4 is provided in the form of a rectangular strip. This strip of material is connected to the inner side 5 of the vacuum cleaner filter bag through a single welding seam 27. This welding seam 27 extends parallel to the left and to the right lateral edge and through the centre of the material layer. Two convex sets, which are each formed by a non-connected part, are indicated by a broken line.

Figure 6E:
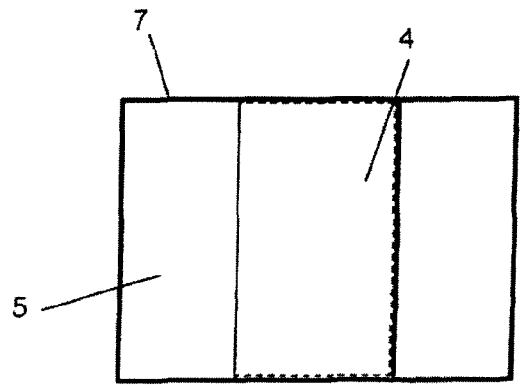

In FIG. 6E, the strip of material 4 is, like in FIG. 6A, connected to the vacuum cleaner filter bag along two seams. Furthermore, an additional welding seam 27 is provided on the right lateral edge of the material layer 4. It follows that an air current can flow below the material layer only from the left side.

Figure 6F:
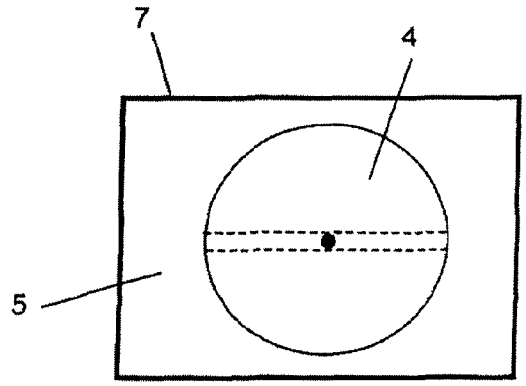

FIG. 6F shows a circular material layer which is centrally arranged on the filter material layer of the vacuum cleaner filter bag. This material layer is connected to the inner side of the bag at a single point 26, which is arranged at the centre of the material layer 4. In this case, two non-connected parts each form a convex set in the form of a segment of a circle.

Figure 6G:
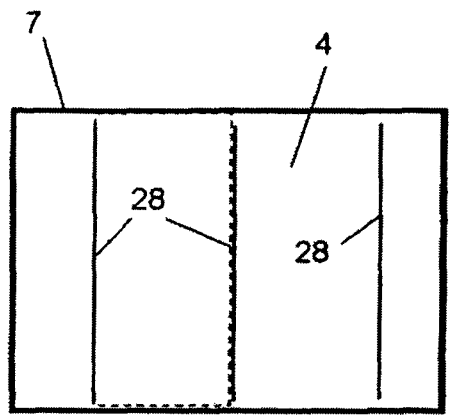

In FIG. 6G, the material layer 4 fully covers the filter material layer located in opposed relationship with the inlet opening and is connected to said filter material layer along the seams 7. The material layer has three slits 28 through which an air current can flow below the material layer. In the example shown, a convex area between two slits is indicated by a broken line.

Figure 6H:
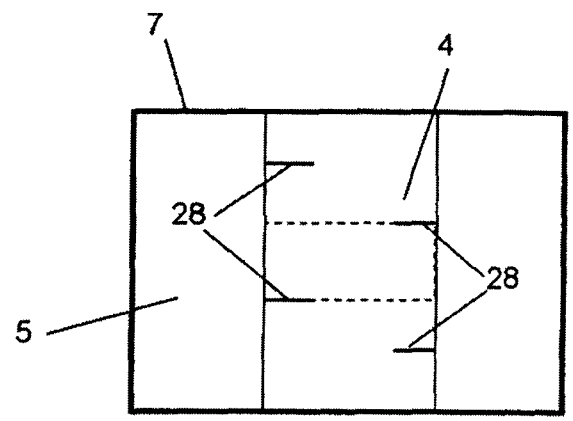

In FIG. 6H, the area of the material layer is again smaller than the area of the bag wall connected thereto along the seams. Four slits 28 are here provided at right angles to the open lateral edges of the material layer so as to support the flow of an air current below the material layer still further.

In addition to the embodiments shown in FIGS. 6A and 6H, other alternatives are possible as well. In particular, the shape, the dimensions and the mode of arrangement of the material layer can be modified. Furthermore, the material layer can also be connected in some other way, e.g. through a plurality of welding spots, to the filter material layer at the bag inner side of said filter material layer. In addition, two or more material layers can be provided, e.g. two superimposed rectangular strips which are connected to the vacuum cleaner filter bag along the seam, in a manner corresponding to FIG. 6A.

In particular, the material layer shown in FIG. 6A to 6H can consist of individual fibres which are essentially not connected to one another (with the exception of connections established via connections to the vacuum cleaner filter bag). These fibres can be oriented parallel to or perpendicular to the longitudinal direction of the strip shown in FIG. 6A to 6E and they can be connected to the inner side 5 of the bag at each end of the fibres in the longitudinal direction of the fibres.

Alternatively or additionally, the fibres can be connected to one another and to the inner side 5 of the bag by a welding seam or by a glue line along the width of the strip shown in FIG. 6A to 6E or at an oblique angle thereto; i.e. in an example where the depicted strip consists of fibres that are arranged parallel to the strip direction, the fibres, after having been arranged in their parallel orientation, can be fixed to the inner side 5 of the bag at right angles to their longitudinal direction by means of welding or glueing. All the fibres can be fixed simultaneously in one operation to the upper seam 7 of the vacuum cleaner filter bag shown in FIG. 6A and they can be fixed simultaneously to the lower seam 7 in another operation. With the exception of this fixing to the respective seams, the fibres are not connected to one another.

Figure 7:
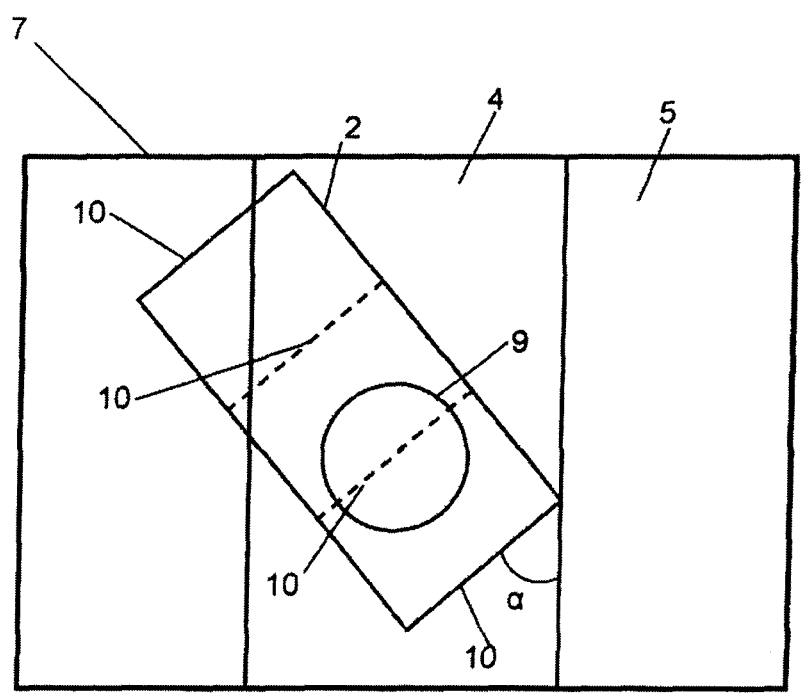
FIG. 7 shows a top view of the inner side of a vacuum cleaner filter bag with a material layer with a projection of a deflection device.

FIG. 7 shows a top view of the inner side 5 of a vacuum cleaner filter bag having a material layer 4 attached thereto. In addition, the outlines of a collapsible deflection device 2 are projected onto the surface of the material layer and of the filter material layer. Especially the fold lines 10 on the lateral edges as well as the entrance opening 9 are shown. In the example shown, the deflection device comprises two exit openings, which are each as large as the whole lateral face of the rectangular parallelepiped as soon as the vacuum cleaner filter bag is in operation. The discharge directions are indicated by two arrows. It follows that the deflection device shown corresponds to the embodiment shown in FIG. 2.

As can be seen from FIG. 7, each fold line 10 encloses an angle α with a material-layer boundary or lateral edge (extending vertically in the view shown) which is included in the non-connected part and which is therefore not connected to the inner side of the bag. This angle α is preferably at least an angle of 15°. This allows an air current that is discharged from the deflection device when the vacuum cleaner filter bag is in operation to flow into the vacuum cleaner filter bag in such a way that it will be able to flow below the material layer 4 in an advantageous manner. A specially preferred angle is α=90° in the case of which the discharge directions are perpendicular to the lateral edges of the material layer when the deflection device shown is used.

Figure 8:
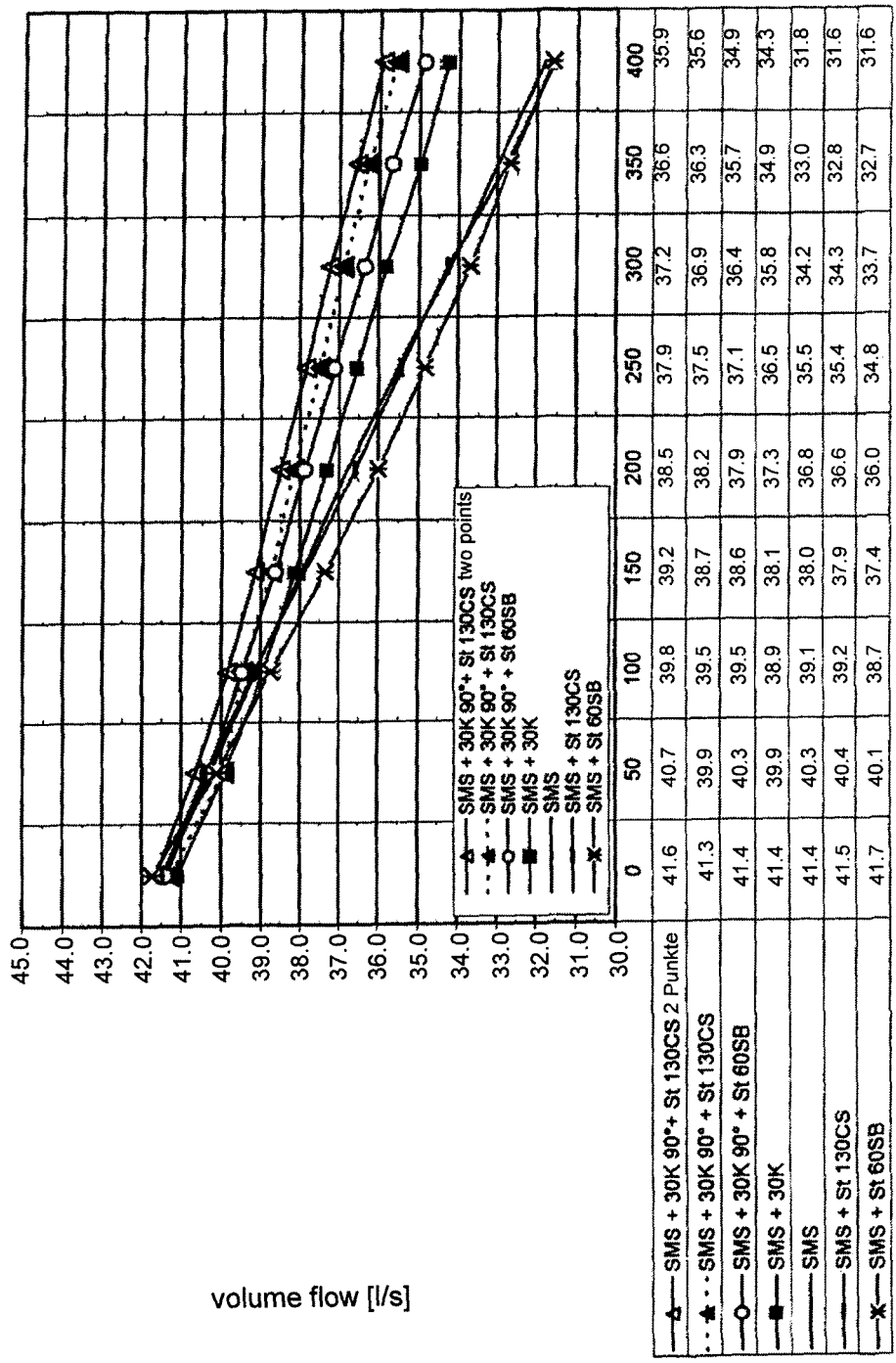
FIG. 8 to 10 show diagrams with measurements of the volume flow for various vacuum cleaner filter bags.
Figure 9:
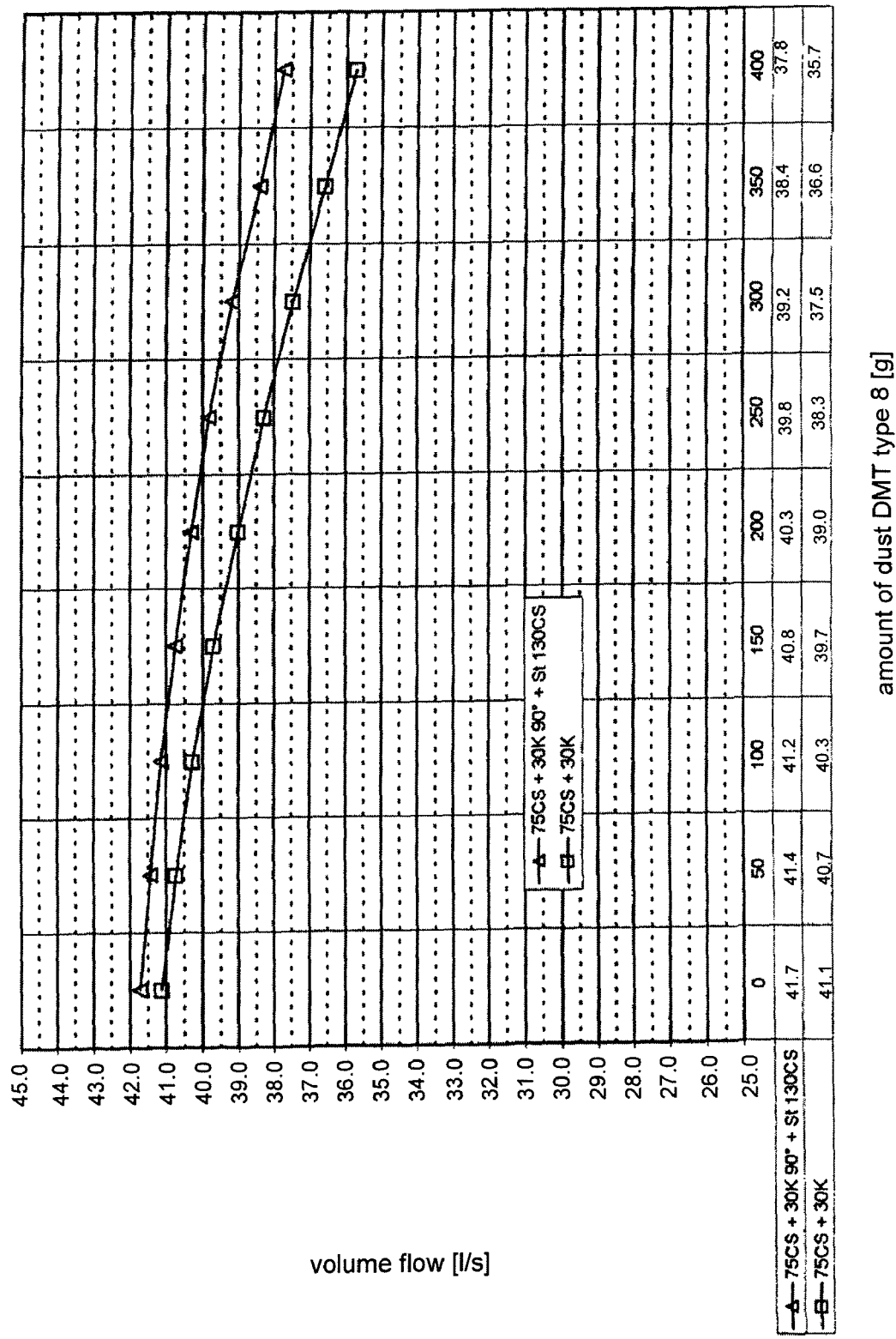
Figure 10:
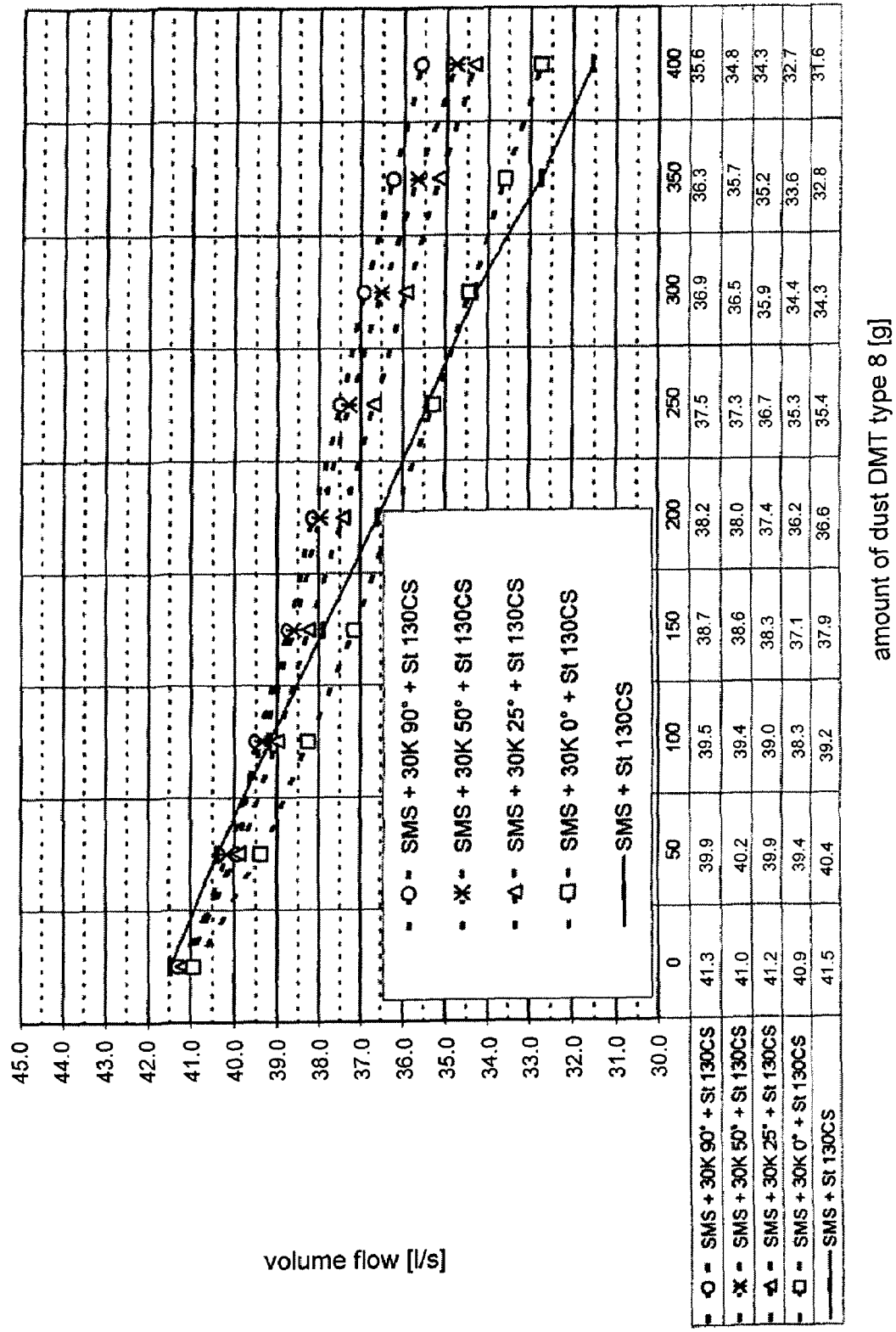

FIG. 8 to 10 illustrate the surprising improvements that have been achieved in the case of conventional vacuum cleaner filter bags by the use of a deflection device and of a material layer of the type described hereinbefore. In particular, various vacuum cleaner filter bags were subjected to dust loading tests in the course of which defined amounts of dust were sucked into the vacuum cleaner filter bag and the residual volume flow was measured.

The test were executed according to DIN EN 60312:2005-02 and E DIN IEC 60312/A100: 2005-06 obtainable at the publishing house Beuth Verlag, Berlin. The tests correspond precisely to the draft standard E DIN IEC 60312/A100:2005-06 with the amendments to section 2.9 of DIN EN 60312: 2005-02 described therein. The test set-up corresponds to that described in 2.9.1.1 to 2.9.1.3.

For measuring the volume flow (determination of the differential pressure in a measurement chamber ahead of/behind the measuring orifice with a diameter of 40 mm), the measuring device described in DIN EN 60312:2005-02 under 5.2.8.2 to 5.2.8.4 (embodiment B) was used. The test dust used was the premixed DMT test dust type 8 of the German Montan Technologie GmbH.

The vacuum cleaner used was a Miele S 5220 which was operated with maximum power. The size of the flat bags was 317×330 mm. The material layer in the form of a rectangular strip, connected to the bag inner side of the filter material layer of a filter bag, had a width of 130 mm. The deflection device had the form of a rectangular parallelepiped of the type shown in FIG. 3 and it was connected to the filter material of the vacuum cleaner filter bag analogously to FIG. 2. The material of the deflection device was cardboard; the dimensions were 80 mm×80 mm×30 mm (length×width×height).

During the test, the vacuum cleaner filter bag to be tested was installed in the vacuum cleaner after a 10-minute warming-up period of the appliance. The volume flow without any dust load was read after an appliance operating time of 1 minute. Subsequently, the first dust dose of 50 g was sucked in within 30 seconds. After 1 minute, the resultant volume flow (in $m^3/h$) was read off. This step was repeated in a corresponding manner for the sub-sequent dust additions until 400 g of dust had been added.

The vacuum cleaner filter bags compared were filter bags which comprised neither a deflection device nor a material layer, those which comprised a deflection device or a material layer, and those which comprised a deflection device and a material layer.

In the figures, the measured values of volume flow (in l/s) are plotted against the amount of dust sucked in. Furthermore, a table comprising the precise values of the respective measurement results in the case of 0 g, 50 g, 100 g, . . . , 400 g amounts of dust is shown below each diagram.

The filter media used were obtained from Airflo Europe N. V., Overpelt, Belgium. The designations in the diagrams have the following meaning:

The first code ("SMS" or "75CS") stands for the filter material of the vacuum cleaner filter bag, i.e. the filter material layers which have been used for producing the flat bag. "SMS" stands for a nonwoven composite fabric comprising—in the direction of air flow, i.e. from the inner side to the outer side of the bag—a spunbond (17 $g/m^2$ weight per unit area), a meltblown (24 $g/m^2$) and a spunbond (25 $g/m^2$). "75CS" stands for a nonwoven composite fabric comprising—in the direction of air flow—a spunbond (17 $g/m^2$), an dry-laid nonwoven of electrostatically charged split fibres (75 $g/m^2$), a meltblown (24 $g/m^2$) and a spunbond (25 $g/m^2$).

The code "30K" means that a deflection device is provided; if an angle is additionally indicated, it is the angle α in FIG. 7 between the lateral edge of the deflection device (perpendicular to the plane of the exit opening) and the non-connected lateral edge of the material layer.

"St" indicates that a material layer was connected to the inner side of the filter material layer. The subsequent code ("130CS or 60SB") explains the material of which the material layer consisted. "130CS" stands for a nonwoven composite fabric comprising a spunbond (17 $g/m^2$), an dry-laid nonwoven of electrostatically charged split fibres (130 $g/m^2$), a meltblown (24 $g/m^2$) and a spunbond (25 $g/m^2$). "60SB" is a spunbond having a weight per unit area of 60 $g/m^2$. If no further information is provided, the material layer is connected to the inner side along the filter bag seams (FIG. 6A); the information "2 points" means that a connection according to FIG. 6B is provided.

It follows that "SMS+30K 90°+St 130CS" means, for example, that the filter bag examined was a filter bag which consisted of SMS material (as described above) and which comprised a deflection device, whose fold lines were oriented perpendicularly to the non-connected lateral edge of the material layer, and a material layer of 130CS material.

From FIG. 8 it can first be seen that a filter bag comprising only a material layer but no deflection device ("SMS+130CS" and "SMS+60SB") leads to a deterioration of the performance in comparison with a bag having neither a material layer nor a deflection device ("SMS"), whereas the combination of a deflection device with a material layer leads to a significant improvement in the case of a 60SB strip as well as in the case of a 130CS strip. Fixing with two points according to FIG. 6B increases the performance still further.

From FIG. 9 it can be seen that, even when a filter material with a high dust holding capacity ("75CS", especially in view of the dry-laid nonwoven) is used for the bag, the combination of a deflection device and of a loose strip of material according to FIG. 6A will lead to a significant improvement of the performance.

FIG. 10 shows the influence of the mode of arrangement of the deflection device with respect to the loose strip of material. The angle referred to in said figure corresponds to the angle α in FIG. 7.

Even in the case of an angle of 0°, i.e. when the fold lines of the deflection device are oriented parallel to the non-connected lateral edges of the material layer, an improvement will be obtained in the long run (for larger amounts of dust). The best result will, however, be achieved on the basis of an angle α=90°.

The invention claimed is:

1. A vacuum cleaner filter bag with an inlet opening, the filter bag comprising:
    a deflection device arranged in an interior of the vacuum cleaner filter bag in an area of the inlet opening such that the deflection device surrounds the inlet opening of the vacuum cleaner filter bag at least partially and is secured to an inner side of the bag and implemented such that an air current flowing in through the inlet opening can be deflected by the deflection device, the deflection device dividing the air current into at least two subcurrents with opposite directions of flow; and
    an air-permeable material layer arranged in the interior of the vacuum cleaner filter bag, and connected to said vacuum cleaner filter bag at at least one point, and includes at least one part that is not connected to the vacuum cleaner filter bag and the at least one part that is not connected includes part of a boundary of the material layer.

2. A vacuum cleaner filter bag according to claim 1, wherein an area of the material layer is smaller than an area of an inner side of the vacuum cleaner filter bag.

3. A vacuum cleaner filter bag according to claim 1, wherein an area of said at least one part amounts to at least 20% of an area of the material layer.

4. A vacuum cleaner filter bag according to claim 1, wherein a convex set is formed by said at least one part on a surface of the material layer.

5. A vacuum cleaner filter bag according to claim 1, wherein said at least one part includes the projection point which results from a perpendicular projection of a geometric centre of gravity of the material layer onto a surface on one side of the material layer.

6. A vacuum cleaner filter bag according to claim 4, wherein the at least one part includes a straight line segment on said surface which extends through the projection point and the end points of which are in contact with the respective boundary of the material layer.

7. A vacuum cleaner filter bag according to claim 1, wherein the at least one part includes at least 10% of a boundary of the material layer.

8. A vacuum cleaner filter bag according to claim 1, wherein the material layer has a polygonal, and wherein said at least one part includes part of at least two lateral edges of the material layer.

9. A vacuum cleaner filter bag according to claim 1, wherein the material layer is connected to the vacuum cleaner filter bag at a predetermined number of points, and/or along two seams of the vacuum cleaner filter bag.

10. A vacuum cleaner filter bag according to claim 1, wherein the material layer is rectangular in shape and is connected to the vacuum cleaner filter bag only along two lateral edges.

11. A vacuum cleaner filter bag according to claim 1, wherein the material layer comprises a nonwoven fabric, a paper or an air-permeable foil.

12. A vacuum cleaner filter bag according to dam 1, wherein an area of the material layer corresponds to 10-80% of an area of the inner side of the vacuum cleaner filter bag.

13. A vacuum cleaner filter bag according to claim 1, wherein the material layer is connected to the vacuum cleaner filter bag in opposed relationship with an inlet opening of said vacuum cleaner filter bag.

14. A vacuum cleaner filter bag according to claim 1, wherein the at least one part is provided with at least one slit.

15. A vacuum cleaner filter bag according to claim 1, wherein the vacuum cleaner filter bag is implemented as a flat bag comprising two rectangular filter material layers interconnected along a boundary, and wherein the material layer is connected to the filter material layer located opposite the inlet opening of the vacuum cleaner filter bag and has a rectangular shape whose width corresponds to 10-80% of the width of the filter material layer connected thereto and/or whose length corresponds to 60-100% of the length of the filter material layer of the vacuum cleaner filter bag connected thereto.

16. A vacuum cleaner filter bag according to claim 1, wherein the material layer comprises a laminate.

17. A vacuum cleaner filter bag according to claim 1, wherein the material layer comprises individual fibres which are not connected to one another, or a fibre net of films.

18. A vacuum cleaner filter bag according to claim 17, wherein at least a part of the individual fibres is arranged side by side in spaced or non-spaced relationship with one another or such that the individual fibres overlap one another.

19. A vacuum cleaner filter bag according to claim 17, wherein at least part of the fibres is connected at both fibre ends to the vacuum cleaner filter bag in a longitudinal direction of the fibres.

20. A vacuum cleaner filter bag according to claim 17, wherein at least part of the fibres is connected to the vacuum cleaner filter bag through one or a plurality of line- or area-shaped connections.

21. A vacuum cleaner filter bag according to claim 1, which further comprises an additional air-permeable material layer arranged in the interior of the vacuum cleaner filter bag and connected to the vacuum cleaner filter bag and/or the other air-permeable material layer at at least one point, said additional air-permeable layer comprising at least one part which is not connected to the vacuum cleaner filter bag and/or the other air-permeable material layer and which includes part of the boundary of the material layer.

22. A vacuum cleaner filter bag according to claim 1, wherein the deflection device comprises at least one deflection surface arranged in opposed relationship with an entrance opening.

23. A vacuum cleaner filter bag according to claim 22, wherein an area of the at least one deflection surface corresponds to, or is larger than the area of the entrance opening.

24. A vacuum cleaner filter bag according to claim 22, wherein the at least one deflection surface is arranged at a predetermined angle relative to a plane of the entrance opening.

25. A vacuum cleaner filter bag according to claim 1, wherein the deflection device has the shape of a cylinder, a truncated cone, a rectangular parallelepiped or a frustum of pyramid having an entrance opening in its top surface and at least one exit opening in a sidewall of the deflection device.

26. A vacuum cleaner filter bag according to claim 1, wherein the deflection device comprises a first position wherein dimensions in a direction perpendicular to the plane of the inlet opening will be smaller than the dimensions comprising a second position.

27. A vacuum cleaner filter bag according to claim 26, wherein the deflection device is adapted to be moved from said first position to said second position by a suction air current.

28. A vacuum cleaner filter bag according to claim 26, wherein the deflection device has fold lines so that the deflection device is adapted to be moved from said first or second position to said second or first position.

29. A vacuum system comprising a vacuum cleaner filter bag with an air-permeable material layer disposed in a vacuum cleaner with a deflection device which is implemented as part of a connecting piece for the vacuum cleaner, which further comprises a connection means for connecting the deflection device to a fitting that connects the vacuum cleaner filter bag to a suction tube of the vacuum cleaner, wherein the connection means and the deflection device are implemented such that, when the vacuum cleaner is in operation, the deflection device is arranged in an interior of the vacuum cleaner filter bag and the deflection device surrounds an inlet opening of the vacuum cleaner filter bag at least partially and is secured to an inner side of the bag and that an air current flowing into the connection means will be deflected in the deflection device and the deflection device divides the air current into at least two subcurrents with opposite directions of flow, and wherein the material layer is arranged in the interior of the vacuum cleaner filter bag, is connected to said vacuum cleaner filter bag at at least one point, and comprises at least one part which is not connected to the vacuum cleaner filter bag and which includes part of a boundary of the material layer.

* * * * *

UNITED STATES PATENT AND TRADEMARK OFFICE
CERTIFICATE OF CORRECTION

PATENT NO. : 8,382,871 B2  Page 1 of 1
APPLICATION NO. : 12/093932
DATED : February 26, 2013
INVENTOR(S) : Ralf Sauer et al.

It is certified that error appears in the above-identified patent and that said Letters Patent is hereby corrected as shown below:

On the Title Page

Item [30], line 1 under "Foreign Application Priority Data", replace "05025480" with --05025480.4--.

Item [30], line 2 under "Foreign Application Priority Data", replace "05025904" with --05025904.3--.

Item [30], line 3 under "Foreign Application Priority Data", replace "05027013" with --05027013.1--.

Item [30], line 4 under "Foreign Application Priority Data", replace "05027219" with --05027219.4--.

Item [30], line 5 under "Foreign Application Priority Data", replace "06003723" with --06003723.1--.

Item [30], line 6 under "Foreign Application Priority Data", replace "06004980" with --06004980.6--.

Item [30], line 7 under "Foreign Application Priority Data", replace "10 2006 016 009" with --10 2006 016 009.6--.

In the Claims

In column 20, claim 12, line 8, after "according to" replace "dam 1," with --claim 1,--.

Signed and Sealed this
First Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO.       : 8,382,871 B2                                   Page 1 of 1
APPLICATION NO. : 12/093932
DATED            : February 26, 2013
INVENTOR(S)      : Sauer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 798 days.

Signed and Sealed this
First Day of September, 2015

Michelle K. Lee
*Director of the United States Patent and Trademark Office*